Nov. 8, 1932.   V. BAILEY   1,886,862
ANIMAL TRAP
Filed April 26, 1932
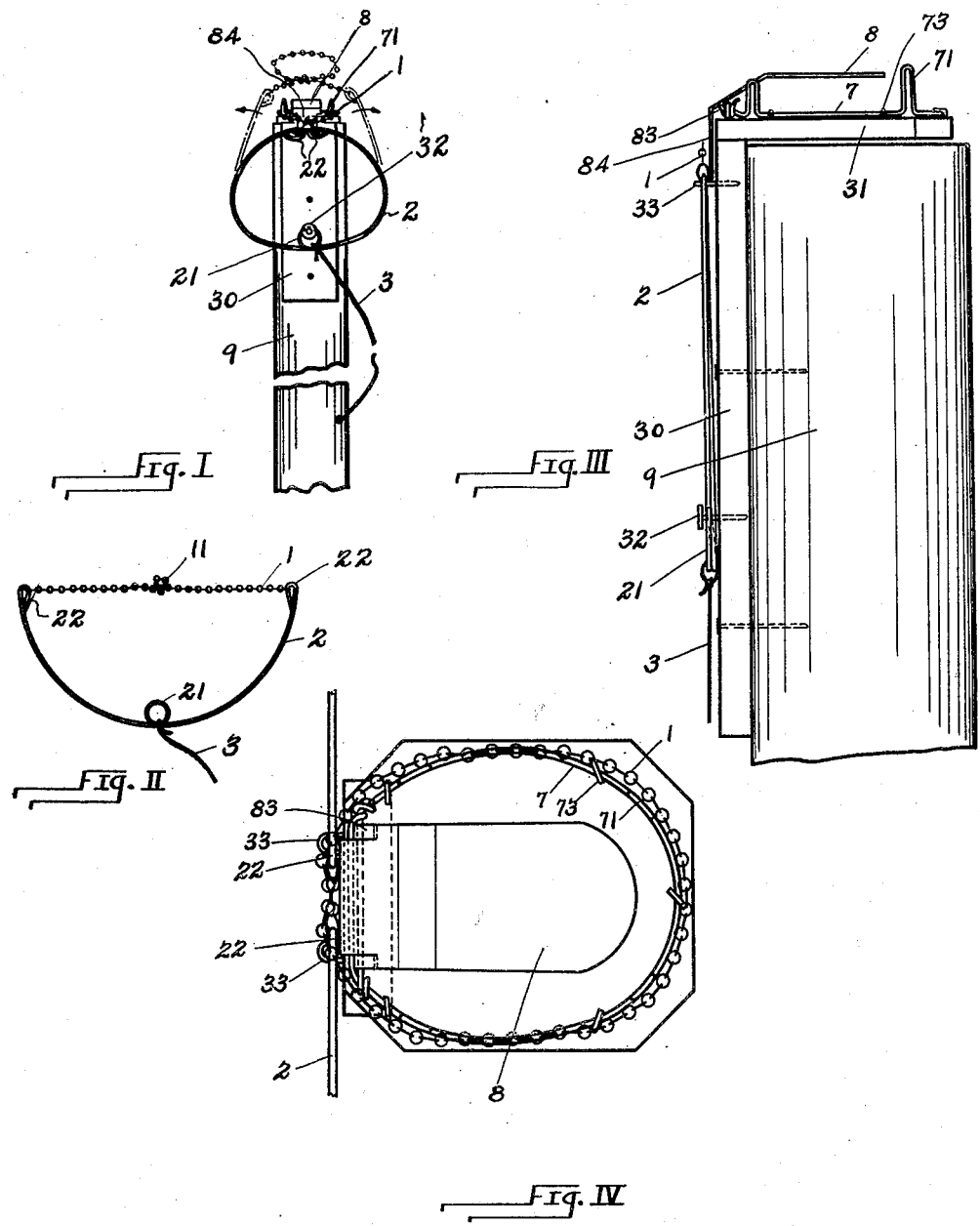
INVENTOR
Vernon Bailey
by Christy Christy and Wharton
his attorneys Patented Nov. 8, 1932

1,886,862

UNITED STATES PATENT OFFICE

VERNON BAILEY, OF WASHINGTON, DISTRICT OF COLUMBIA

ANIMAL TRAP

Application filed April 26, 1932. Serial No. 607,554.

My invention relates to improvements in animal traps. The trap of the invention is a pole-trap; that is to say, it is a trap designed to be set on the top of a post or pole and to serve for the catching of birds, particularly of hawks and owls. The object in view is to catch without injuring the victim, and I characterize the trap as a painless pole trap.

In the accompanying drawing Fig. I is a view in side elevation of the trap mounted upon the top of a pole. The trap is here shown in full lines in set position and to the full-line showing a dotted-line diagram is added, illustrative of operation. Fig. II is a view in plan of the noose portion of the trap when sprung. Fig. III is a view to larger scale, showing in elevation the trap mounted upon the top of the pole. The line of view is perpendicular to that of Fig. I, and, for the sake of clearness, the loop in the noose element is omitted from the showing of Fig. III. Fig. IV is a view to still larger scale, showing the trap in plan from above; and here, too, the trap is shown in set position.

The trap includes a noose part and a pan part, separable the one from the other, and united only when the trap is set. The springing of the trap frees the noose part from the pan part, and it is the noose part alone that remains the effective part of the trap in holding the captured animal.

The noose part includes a noose, 1; a spring, 2; and, ordinarily, a strand of flexible character here shown as a cord 3 for securing the noose part to a suitable anchorage. The noose 1 consists essentially of a flexible strand of suitable material; it may be, and ordinarily will be, a length of light metal chain. In the length of the noose a knot 11 is formed. When the trap is set, this knot is loosened and spread, to form a loop surrounding the pan, as shown in Fig. IV. As the ends of the strand are drawn apart, the loop diminishes and the knot tightens upon the leg of the bird that has sprung the trap.

The spring 2 includes two arms that tend to spread from the collapsed position shown in full lines in Fig. I, through the dotted-line position of Fig. I, to the expanded position of Fig. II. To the ends of these arms the ends of the noose 1 are secured. The expansion of the released spring, then, draws the ends of the noose apart, and tightens the knot upon the leg of the captured bird. Conveniently the spring is merely a length of resilient wire, shaped to a medial coil 21, with terminal arms. The ends of the arms are formed with eyes 22, in which the ends of the noose 1 may be secured. The medial coil and the terminal eyes have further utility, and presently will appear. The spring is in the form of a bow, and the noose in the form of a bow-string, having in its length a running knot.

The cord 3 may be anchored as preferred. It here is shown to be anchored by being secured to the post 9 upon which the trap is set. Manifestly it may be otherwise anchored. For example, it might to be secured to a ring capable of slipping freely along the pole, or it might be secured to a drag or weight suitably supported adjacent the set trap. Being secured in the manner shown in Fig. I, it will preferably be secured at such a point in the height of the pole, that the captured bird may fly to and rest upon the ground.

The pan part of the trap includes a frame 7 and a pan 8 hinged to the frame. The frame is of the general oval shape shown in Fig. IV and is conveniently formed of wire and is secured permanently to the level top surface of the pole 9, as by staples 73. When the trap is set, the frame carries the expanded noose, and it is accordingly of such size that the loop in the noose of the set trap will, with sufficient clearance, encircle the foot of the intended victim and encircle also the pan and the bait (if any) secured to the pan. The frame is sufficiently larger than the pan to allow free operation of the noose; and the frame will preferably include loop-positioning and guiding fingers 71. The frame is conveniently formed of a single length of wire, bent to shape, the overlapping ends twisted together to form a rigid structure.

The pan is the trigger of the trap. It is a lever, of bell-crank form, its arms extending in right-angled directions, as best shown in Fig. III. At the apex of the angle the pan is pivoted to the frame. Conveniently the pan is formed of a single piece of sheet metal, cut and bent to shape, and the pivoting may be effected by tongues 83 slit from the sheet and turned about the strand of wire of which the frame is formed. One arm of the lever extends when the trap is set horizontally above and spaced at a suitable interval from the upper surface of the pole. To this arm the numeral 8 is in the drawings immediately applied. If the trap is to be baited, this arm is adapted to have the bait secured, closely bound to it; baited or unbaited, it is suitable in shape and size to take the weight of the bird as it comes, either to pounce upon the bait or to perch upon the pan; and, baited or unbaited, the pan is of such size as to swing vertically under the weight of the bird within the spread noose, and to allow the noose to rise and encircle the leg or legs of the bird. The opposite down-bent arm of the lever bears the reference numeral 84.

Conveniently, the trap is mounted on a support formed of two boards 30 and 31, united in L-shaped assembly, and nailed to the pole as shown; and in the foregoing description it will be understood that such a support, being present, is identified with and considered an integral part of the pole. In the outer face of the vertically extending arm 30 of this support is set a nail 32 with enlarged head and two posts 33, 33, which latter may conveniently be in the form of round-arched, double-pronged tacks, sunk half-way into board 30 and standing well out from its surface. These posts 33, 33 are of such size that the eyes 22 formed in the ends of the spring 2 may take freely over them. The nail 32 and the posts 33, 33 are, as clearly appears in Figs. I and III, so spaced that the collapsed spring 2 may be applied with its coil 21 surrounding and caught beneath the head of nail 32 and its eyes 22 slipped over the posts 33. Friction and spring tension suffice to retain the collapsed spring when so applied. These parts 22, 33, 33 are, further, so particularly proportioned and placed that when the trap is set the downwardly extending lever arm 84 of the pan extends between the two posts 33, 33 and underlies the eyes 22.

The trap is set by swinging the pan to the position shown in Fig. III with the arm 84 lying snug against the vertical face of the pole (or board 30) and the arm 8, which constitutes the 'pan' in the more exact meaning of the word, extending horizontally at an interval above the upper surface of the pole (or board 31). The noose part with spring collapsed is then applied, the spring upon nail 32 and posts 33, 33, and the knot in the noose loosened and spread, so that it encircles the fingers 71 of the frame. The set position is shown in Figs. III and IV (though, as has been said, the loop of the noose member is omitted from Fig. III).

The weight of the bird to be caught, descending upon arm 8 of the pan, tends to swing the pan (clockwise, Fig. III), and the security of the spring upon posts 33, 33 is so slight that the weight of the bird is effective: the pan swings, the arm 84 prizes the loops of the spring from the posts 33, 33, and the trap is sprung. The tension of the spring has, however, been effective to hold the coil 21 at its upper part in place beneath the head of the nail 32; and, when the upper ends of the spring are released, they immediately spring upward in expanding, and rise relatively to the pan, as is indicated in dotted lines in Fig. I. As the arms rise they spread, and the effect is that the noose is lifted free of the frame, thrown upwardly, and the knot is drawn taut upon the leg or legs of the bird, well above the talons.

When the trap has so been sprung, the noose part freed entirely from the pan element, is secure upon the victim's legs, and, spring tension being spent, the slight engagement of the coil 21 of the spring upon the nail 32 is immediately broken, and the bird remains, tethered by the cord 3.

The trap, it will be perceived, secures the animal, not by means of spring-backed jaws, but by means of a noose; it does not crush nor mutilate; it secures the victims painlessly; nor will the victim escape, leaving in the trap a severed foot.

I claim as my invention:

1. A trap including in combination with a support equipped with two posts a noose part and a pan part, adapted to be assembled and released one from the other, the noose part consisting of a spring in the form of a bow and a noose in the form of a bow-string having a running knot in its extent, the noose part being adapted to be applied in collapsed form and with the ends of the bow adjacent the pan part, upon the posts of the support, and the pan part including a frame adapted to be secured to the support and a pan pivoted to the frame and including two arms, one arm underlying the ends of the spring of the noose part and the other arm extending at an interval from the face of the support.

2. A pole-trap including in combination with a support having adjacent vertical and horizontal faces and two posts set in its vertical face a noose part and a pan part, adapted to be assembled and released one from the other, the noose part consisting of a spring in the form of a bow and a noose in the form of a bow-string having a running knot formed in its extent, the noose part being adapted to be applied in collapsed form, and with the ends of the bow extending upwardly, upon the posts of the support, and the pan part including a frame mounted upon the horizontal face of the support and a pan of bell-crank lever form pivoted to said frame, one lever arm lying against the vertical face of the support and beneath the upper ends of the spring of the noose member, and the other lever arm extending above and at an interval from the vertical face of the support.

3. In a pole-trap, an L-shaped support adapted to be secured to the top of a pole with the stem of the L extending vertically along the side of the pole and the foot of the L overlying horizontally the top of the pole, the outer surface of the vertical member of the support being provided with outstanding posts, a noose part consisting of a spring in the form of a bow and a noose in the form of a bow-string having a running knot in its extent, and adapted to be removably set in collapsed position upon the posts of the vertical face of the support, with the ends of the bow uppermost and adjacent the horizontal face of the support, and a pan part including a frame rigidly mounted upon the horizontal face of the support and a pan of bell-crank lever form pivoted to the frame, one arm of the lever underlying the upper ends of the spring of the noose part and the other arm of the lever extending above and spaced at an interval from the horizontal face of the support.

In testimony whereof I have hereunto set my hand.

VERNON BAILEY.